(12) United States Patent
Charles et al.

(10) Patent No.: US 12,339,634 B2
(45) Date of Patent: Jun. 24, 2025

(54) BATTERY CELL THERMAL FAILURE MITIGATION

(71) Applicants: SERINUS LABS, INC, Berkeley, CA (US); THE REGENTS OF THE UNIVERSITY OF CALIFORNIA, Oakland, CA (US)

(72) Inventors: Gordon Charles, Sunnyvale, CA (US); Hossain Mohammad Fahad, Berkeley, CA (US); Ali Javey, Berkeley, CA (US)

(73) Assignees: SERINUS LABS, INC, Berkeley, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 143 days.

(21) Appl. No.: 18/297,954

(22) Filed: Apr. 10, 2023

(65) Prior Publication Data
US 2023/0244200 A1     Aug. 3, 2023

Related U.S. Application Data

(63) Continuation-in-part of application No. 17/892,622, filed on Aug. 22, 2022, now Pat. No. 11,626,626, (Continued)

(51) Int. Cl.
*G05B 19/042*      (2006.01)
*H01M 10/42*       (2006.01)
(Continued)

(52) U.S. Cl.
CPC ........ *G05B 19/042* (2013.01); *H01M 10/425* (2013.01); *H01M 10/441* (2013.01); (Continued)

(58) Field of Classification Search
None
See application file for complete search history.

(56) References Cited

U.S. PATENT DOCUMENTS

| 6,204,769 B1 * | 3/2001 | Arai ...................... H01M 10/48 340/455 |
| 11,450,918 B2 * | 9/2022 | Pokora ................ H01M 50/342 |

(Continued)

OTHER PUBLICATIONS

International Search Report for an International Application No. PCT/US23/18036, dated Jun. 30, 2023.

*Primary Examiner* — Jermele M Hollington
(74) *Attorney, Agent, or Firm* — Quinn IP Law (57) ABSTRACT

A rechargeable energy storage system includes battery cell(s) and a battery management system (BMS) for detecting cell damage prior to the cell(s) entering an irreversible thermal runaway. The BMS includes gas sensor array(s) for detecting gas(es) vented by the cell(s). Each sensor detects a trace amount of one vented gas indicative of cell damage insufficient to trigger an irreversible thermal runaway. The BMS also includes a controller receiving from the sensor array(s) data indicative of the detected gas trace amounts. The controller compares the detected trace amount with a threshold margin relative to an amount indicative of cell damage that triggers irreversible thermal runaway. The controller additionally identifies damaged cell(s) when the detected trace amount is within the threshold margin. The controller further commands a corrective action to mitigate further damage to the damaged cell(s) and reduce a likelihood of the subject cell(s) entering the irreversible thermal runaway.

20 Claims, 4 Drawing Sheets

Related U.S. Application Data which is a continuation of application No. PCT/US2021/018879, filed on Feb. 19, 2021.

(60) Provisional application No. 62/979,322, filed on Feb. 20, 2020.

(51) Int. Cl.
    *H01M 10/44*     (2006.01)
    *H01M 10/48*     (2006.01)
    *H01M 10/613*     (2014.01)

(52) U.S. Cl.
    CPC ....... *H01M 10/482* (2013.01); *H01M 10/613* (2015.04); *G05B 2219/2639* (2013.01); *H01M 2010/4271* (2013.01); *H01M 2010/4278* (2013.01)

(56) References Cited

U.S. PATENT DOCUMENTS

| | | | |
|---|---|---|---|
| 11,626,626 B2 * | 4/2023 | Fahad | G08B 21/12 |
| | | | 340/632 |
| 12,040,503 B2 * | 7/2024 | Pokora | H01M 50/342 |
| 12,083,914 B2 * | 9/2024 | Campbell | B60L 58/10 |
| 2007/0229294 A1 * | 10/2007 | Vossmeyer | G01N 33/0047 |
| | | | 340/636.19 |
| 2010/0102975 A1 * | 4/2010 | Vossmeyer | G01N 33/0047 |
| | | | 340/636.19 |
| 2011/0059341 A1 * | 3/2011 | Matsumoto | H01M 10/052 |
| | | | 429/82 |
| 2016/0241058 A1 | 8/2016 | Carralero et al. | |
| 2020/0266405 A1 * | 8/2020 | Pokora | H01M 10/625 |
| 2021/0043900 A1 | 2/2021 | Al-Ghanim et al. | |
| 2022/0393258 A1 | 12/2022 | Fahad et al. | |
| 2022/0407176 A1 | 12/2022 | Ryder et al. | |

\* cited by examiner

BATTERY CELL THERMAL FAILURE MITIGATION

CROSS-REFERENCE TO RELATED APPLICATION(S)

This application is a continuation-in-part of U.S. application Ser. No. 17/892,622 filed Aug. 22, 2022, which is a continuation of International Application Serial No. PCT/US 21/18879 filed Feb. 19, 2021, which claims the benefit of U.S. Provisional Application Ser. No. 62/979,322 filed Feb. 20, 2020, all of which are hereby incorporated by reference in their entirety.

GOVERNMENT LICENSE RIGHTS

This invention was made with Government support under SBIR Phase II program contract No.: 2112273 awarded by the National Science Foundation. The Government has certain rights in this invention.

INTRODUCTION

The present disclosure generally relates to a system and a method for mitigation of battery cell thermal failure and forestalling of thermal runaway in a battery cell array.

A battery cell array, such as a battery module, pack, etc., typically includes a plurality of battery cells in close proximity to one another. Batteries may be broadly classified into primary or disposable batteries and secondary or rechargeable batteries. Rechargeable batteries employ specific high-energy chemistries permitting such batteries to be repeatedly recharged and reused, providing the ability to buffer energy input from energy use. Rechargeable batteries may be used to power such diverse items as toys, consumer electronics, and motor vehicles.

Large rechargeable battery cell systems, such as for renewable energy arrangements (e.g., solar energy farms) and electric vehicles (EVs), may be used to store electrical energy for future use and as buffers between peak power generation and peak system loads. To meet design objectives of charging rates, peak output power, and capacity, secondary batteries may be organized into battery systems or arrays with battery cells connected in parallel and/or in series. For example, a plurality of secondary cells may be connected in parallel to form a single layer in a battery stack, a plurality of layers may be connected in series to form a battery module, and an appropriate number of such modules may be assembled in series to form a battery pack having desired output.

As a result of various physical and environmental factors, secondary battery cells may experience damage, decreased internal resistance, and generation of excess thermal energy leading to a thermal event. Excess thermal energy generated by the failure of one cell may cause thermal propagation and subsequent failure of surrounding cells, thus leading to a thermal runaway and catastrophic damage in a battery pack, the host system, and the surrounding environment. Real-time assessment of secondary batteries' state of health is therefore desirable and is typically accomplished with integrated circuits monitoring battery voltage, current, and temperature.

In large battery systems, where the number of individual cells may reach thousands, due to technological limitations of integrated circuit and sensing technology, battery cell state of health monitoring is currently limited to detecting damage following a single cell thermal runaway event, when the entire battery system is already on the verge of thermal runaway. Accordingly, a growing need exists for monitoring battery cells in large battery systems to permit earlier warning of mounting cell damage for mitigation of thermal runaway at the cell level, which significantly reduces the probability of pack level thermal runaway and potential damage to the system's surroundings.

SUMMARY

A rechargeable energy storage system (RESS) includes at least one battery cell and a battery management system (BMS) configured to detect damage in the at least one battery cell prior to the at least one battery cell entering an irreversible thermal runaway event. The subject battery cells may be Lithium-ion or other types of battery cells. The BMS includes at least one gas sensor array configured to detect one or more distinct gases vented by the battery cell(s). Each gas sensor in the array is configured to detect a trace amount of one of the gases vented by the battery cell(s) indicative of damage in the subject battery cell(s) insufficient to trigger an irreversible battery cell thermal runaway. The BMS also includes an electronic controller in operative communication with the gas sensor array(s) and with the battery cell(s).

The electronic controller is configured to receive from the gas sensor array(s) data indicative of the detected trace amount of the at least one gas. The electronic controller is also configured to compare the received data indicative of the trace amount of the at least one gas with a threshold margin relative to an amount of the corresponding at least one gas indicative of damage in the battery cell(s) sufficient to trigger the irreversible battery cell thermal runaway. The electronic controller is additionally configured to identify the battery cell(s) as having been damaged when the detected trace amount is within the threshold margin. The electronic controller is further configured to command a corrective action, e.g., a change of a battery cell operating parameter, to mitigate further damage to the damaged battery cell(s) and reduce a likelihood of the damaged battery cell(s) entering the irreversible battery cell thermal runaway.

The at least one battery cell may include a plurality of battery cells subdivided into multiple battery modules, such that each battery module has multiple battery cells connected in parallel and/or series. The at least one gas sensor array may include a plurality of gas sensor arrays, wherein at least one of the plurality of gas sensor arrays corresponds to each individual battery module. In such an embodiment, the electronic controller may be additionally configured to identify a battery module having the damaged at least one battery cell when the trace amount of the at least one gas detected by a corresponding gas sensor array is within the threshold margin.

The corrective action may include disconnecting one of physically and electrically the identified battery module having the damaged at least one battery cell from the RESS.

The RESS may additionally include an RESS climate control subsystem configured to regulate temperature of the at least one battery cell. In such an embodiment, the corrective action may include regulating the RESS climate control subsystem to increase a cooling rate of the identified battery module having the damaged at least one battery cell.

More than one of the plurality of gas sensor arrays may be arranged in distinct predefined positions in the RESS. In such an embodiment, the electronic controller may be further configured to identify location of the damaged at least one battery cell using the predefined positions of the plurality of gas sensor arrays and the received data therefrom.

The electronic controller may be further configured to command application of the corrective action to the damaged at least one battery cell at the identified location.

The corrective action may include disconnecting the at least one battery cell from the RESS.

The corrective action may additionally include regulating the RESS climate control subsystem to increase a cooling rate of the damaged at least one battery cell.

The corrective action may include adjusting a current charge and/or a current discharge rate of the damaged battery cell(s).

The RESS may employ charge balancing configured to shift electrical charge from a battery cell with lower charge capacity to a battery cell with higher charge capacity. In such an embodiment, the corrective action may include either increasing or decreasing a rate of the charge balancing across individual battery cells in the RESS.

Each gas sensor may be configured to detect a trace amount of one of hydrogen ($H_2$), carbon dioxide ($CO_2$), and carbon monoxide (CO) gases vented by the lithium-ion battery cell.

The threshold margin may be established based on a position of the gas sensor array relative to the corresponding battery module. For example, the detected trace amount may be 10 ppm for $H_2$, 500 ppm for $CO_2$, 10 ppm for CO, and 10 ppm for $C_2H_4$.

Each gas sensor array may include a plurality of silicon chemical-sensitive field effect transistors (CS-FETs) arranged on a microchip. In such an embodiment, each CS-FET may be configured to detect the trace amount of one of the distinct gases vented by the damaged at least one battery cell.

A method of managing operation of a rechargeable energy storage system (RESS), as described above, is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of a number of hardware, software, and/or firmware components configured to perform the specified functions.

Figure 1:
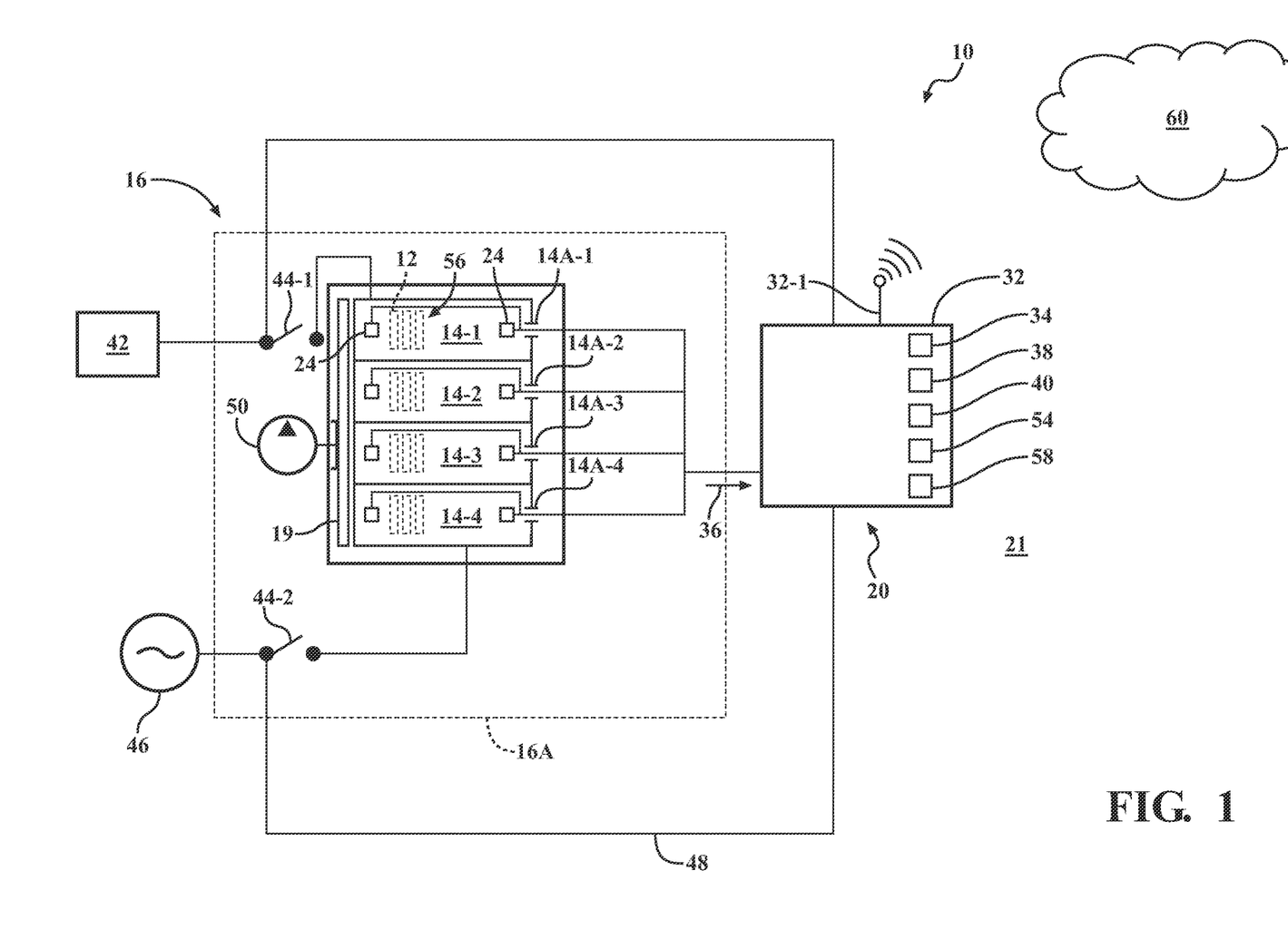
FIG. 1 is a circuit diagram of a multi-cell rechargeable energy storage system (RESS) having rechargeable battery cells connected to a battery management system (BMS) equipped with gas sensor arrays for detecting multiple distinct gases vented by the battery cells, according to the present disclosure.

Referring to FIG. 1, a generalized rechargeable energy storage system (RESS) 10 is depicted. The RESS 10 includes one or more rechargeable battery cells 12, which may be lithium-ion (Li-ion) or other types of battery cells organized into a battery pack. In the RESS 10 having multiple battery cells 12, the subject cells may be electrically connected in parallel and in series. For example, as shown in FIG. 1, a plurality of battery cells 12 may be electrically connected in parallel and/or series to form an individual module, such as each of the modules 14-1, 14-2, 14-2, and 14-4, and having a respective module container or holder 14A. A plurality of such modules, e.g., 14-1, 14-2, 14-2, 14-4, may be assembled in series to form a battery pack 16 and enclosed in a battery pack housing 16A. The RESS 10 is configured to generate and store electrical energy through heat-producing electro-chemical reactions for supplying the electrical energy to power an electrical load, such as an electric vehicle (EV) or a stationary, non-automotive system. While storage of energy in stationary application typically includes charging using an external source, EVs may include charging from mains power as well as regenerative charging using the vehicle's kinetic energy, such during braking. Although one battery pack 16 and four modules 14-1, 14-2, 14-3, 14-4 are shown, nothing precludes the RESS 10 from having a greater number of such battery packs and modules.

Figure 2:
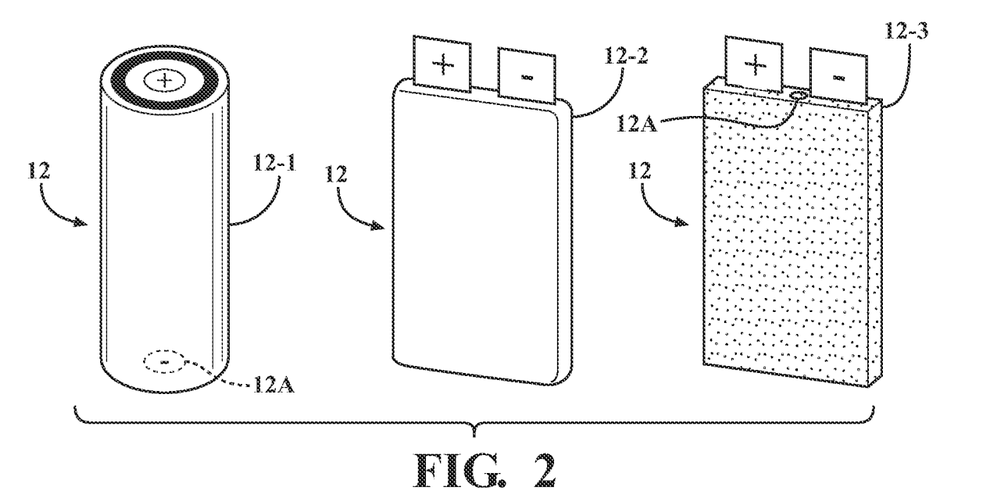
FIG. 2 is a schematic side view of three exemplary embodiments of the battery cells shown in FIG. 1.

FIG. 2 depicts three exemplary embodiments of rechargeable, e.g., Li-ion, battery cells 12. Each of the subject embodiments of the battery cell 12 includes a housing configured to encase a respective negative electrode or anode, a positive electrode or cathode, as well as the battery's electrolyte, gasket(s), etc. Specifically, the respective housings of the three battery cells 12 shown in FIG. 2 include a cylindrical casing 12-1, generally configured as a hard metal container, a pouch 12-2 configured as a relatively flexible laminate material container, and a prismatic casing 12-3 configured as a rigid, parallelogram shaped container. Each of the subject embodiments of the cell housing may include an exhaust vent 12A, such as an opening or a chimney configured to vent gases emitted by the battery cell 12. A battery cell 12 having a cylindrical casing 12-1 may have a dedicated exhaust vent 12A configured as an opening or a chimney. On the other hand, battery cells 12 having either a pouch 12-2 or a prismatic casing 12-3 may be non-vented. In such pouch or prismatic battery cells, trace amounts of gases are generally detected when sealing of the corresponding housing has failed and the battery cell has begun to operate at reduced capacity.

With resumed reference to FIG. 1, the RESS 10 may also include an RESS climate-control subsystem 19 configured to remove thermal energy from the battery cells 12. In a nonlimiting example, the RESS climate-control subsystem 19 may; for example, include a cold-plate or heat sink. The heat sink is generally positioned proximate and in direct contact with the battery cells 12 to thereby absorb thermal energy from the respective battery cells. The heat sink may, for example, be configured as a coolant plate having a plurality of coolant channels. The coolant channels are specifically configured to circulate a coolant supplied by an associated fluid pump to thereby remove thermal energy from the battery cells 12 while the RESS 10 generates/stores electrical energy.

Alternatively, in another nonlimiting example, the RESS climate-control subsystem 19 may include a heat pump configured to remove thermal energy from the battery cells 12, maintain an optimal cell temperature, and improve operating efficiency of the RESS 10. The heat pump may employ an evaporator with a plurality of refrigerant channels positioned proximate and in direct contact with the battery cells 12 to transfer thermal energy to or therefrom. A pressure drop in the refrigerant channels of such a heat pump is used to evaporate and cool the refrigerant, the channels, and their surroundings. The expanding refrigerant is fed into an associated compressor, which compresses and feeds the refrigerant back to the evaporator, while permitting thermal energy to be radiated away from the battery cells 12. The system compressor is typically a powered and controllable device.

The RESS 10 also includes a battery management system (BMS) 20. The BMS 20 is configured to regulate operation of the RESS 10, and, particularly, to detect damage in at least one of the battery cells 12 prior to the subject cell(s) entering an irreversible thermal runaway. In other words, the BMS 20 is designed and constructed to perform early detection of damage in the battery cell(s) 12 prior to the cell deteriorating to such a degree that the cumulative damage causes an irreversible thermal runaway event.

Generally, during normal operation of the RESS 10, the RESS climate-control subsystem 19 is effective in absorbing thermal energy released by the battery cells 12. However, during extreme conditions, such as during a thermal runaway event, the amount of thermal energy released by a particular cell 12 undergoing the event may exceed capacity of the RESS climate-control subsystem 19 to efficiently transfer heat, e.g., from the battery pack housing 16A to ambient environment 21. As a result, excess thermal energy will typically be transferred between neighboring cells 12 of a particular module and between neighboring modules 14-1, 14-2, 14-3, 14-4, leading to propagation of the thermal runaway through the RESS 10. The term "thermal runaway event" generally refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures.

For example, in the event one battery cell 12 in one module 14, such as the module 14-1, is damaged, the generated excess gases would give rise to highly elevated internal cell pressures, leading to a thermal runaway event (with temperatures up to 1,500 degrees Celsius) and catastrophic cell failure. In the event of a single battery cell thermal event, the affected cell may experience further, thermally induced damage having a tendency to rupture the casing 12-1, 12-2, or 12-3 and generate a stream of hot gases and cell debris into the interior of the RESS 10, e.g., through the first battery cell module 14-1. The hot gases and debris, as well as the generally elevated temperatures, resulting from a single cell thermal runaway event are likely to trigger a thermal runaway of other neighboring battery cells 12. The thermal runaway event may then spread from the first battery cell module 14-1 to the second battery cell module 14-2 and trigger thermal runaway of its battery cells. Accordingly, such transfer of heat typically increases the likelihood of a chain reaction, affecting a significant part of the RESS 10.

Figure 3:
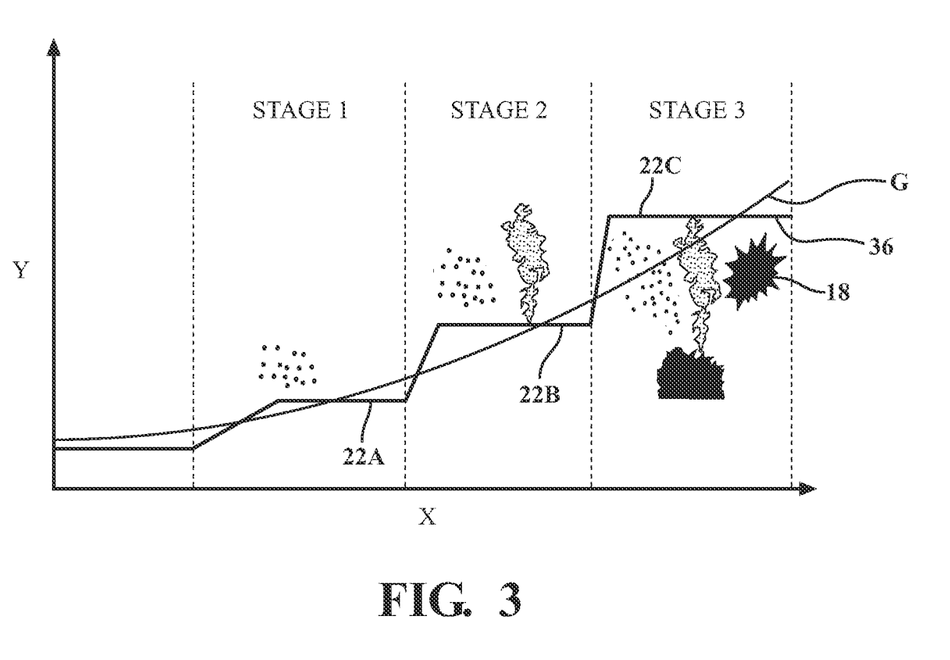
FIG. 3 is a data plot illustrating an amount of vented gas by a typical battery cell leading up to battery cell failure as a function of time.

Li-ion battery cells, such as the battery cells 12, are particularly known to emit or vent gases such as hydrogen ($H_2$), carbon dioxide ($CO_2$), and carbon monoxide (CO) while undergoing a thermal chain reaction, in advance of catastrophic battery failure. As shown in FIG. 3, the amount of gas a typical Li-ion battery cell vents leading up to battery cell failure is described by a curve G, wherein the X-axis in the graph represents time and Y-axis represents the amount of a particular gas vented by the battery cell. The increase in the vented amount of gas described by the curve G may be broken up into three general categories or stages. In Stage 1, the amount of emitted gas may be qualified as a trace and indicated via numeral 22A. In Stage 2, the amount of emitted gas may be qualified as a moderate, which is generally accompanied by visible smoke, and indicated via numeral 22B. In Stage 3, the amount of emitted gas may be qualified as a significant or abundant, is indicated via numeral 22C, and is generally accompanied by thermal runaway (identified in FIG. 3 via numeral 18), battery cell failure, and shortly by visible fire and an explosion. In practice, duration of Stage 2 may be brief and the transition between Stage 1 and Stage 2 may be blurred. Therefore, in general, it may be desirable to mitigate battery cell damage during or shortly after Stage 1.

With resumed reference to FIG. 1, the BMS 20 includes one or more gas sensor arrays 24 configured to detect one or more distinct gases vented by at least one of the battery cell 12, such as in individual modules 14-1, 14-2, 14-3, 14-4. The gas sensor array(s) 24 may be arranged in distinct predefined positions within the RESS 10. Specifically, each gas sensor 24 is configured to detect the trace amount 22A of one of the gases vented by the battery cell(s) 12 in Stage 1 shown in FIG. 2. Accordingly, the trace amount 22A vented by the battery cell(s) 12 and detected by the gas sensor arrays 24 is indicative of damage in the subject cell(s) 12 that is insufficient to trigger an irreversible battery cell thermal runaway. Each gas sensor array 24 may be configured as a microchip or multi-gas sensor array system on chip (SoC) (shown in FIGS. 4 and 5).

As noted above, a battery cell 12 may be part of an RESS 10 having a plurality of analogous, such as Li-ion, battery cells 12 arranged in individual battery modules 14. Accordingly, in such an embodiment, the BMS 20 may include multiple gas sensor arrays 24, such as one or more microchips for each battery module 14-1, 14-2, 14-3, 14-4, as shown in FIG. 1. Each of the gas sensor arrays 24 may be arranged in a central position relative to or inside an individual battery module 14-1, 14-2, 14-3, 14-4, proximate to or inside a respective module exhaust opening 14A-1, 14A-2, 14A-3, 14A-4, near a far wall relative to the respective module exhaust opening, or in each of the subject positions, to detect multiple distinct gases vented by the individual battery cells 12 on a module level. In other words, in such an embodiment each gas sensor arrays 24 may be arranged to detect gases vented by one or a plurality of battery cells 12 situated in a particular battery module 14. Alternatively, in an RESS 10 having a single battery pack 16 not subdivided into discrete modules, individual sensor arrays 24 may be arranged in distinct predefined positions throughout the RESS.

Figure 4:
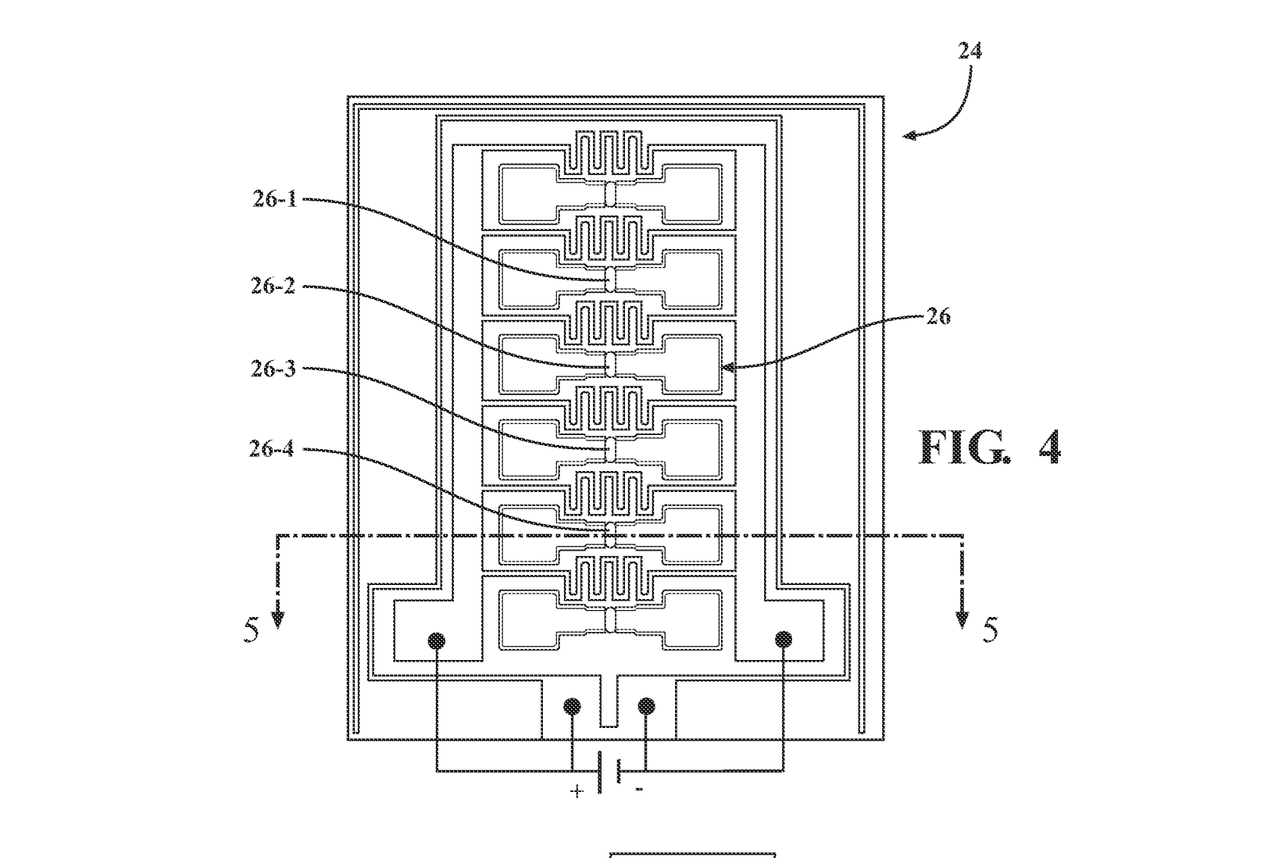
FIG. 4 is a schematic top view of an individual gas sensor array shown in FIG. 1, specifically depicting a silicon chemical-sensitive field effect transistor (CS-FET) embodiment of individual gas sensors, according to the present disclosure.
Figure 5:
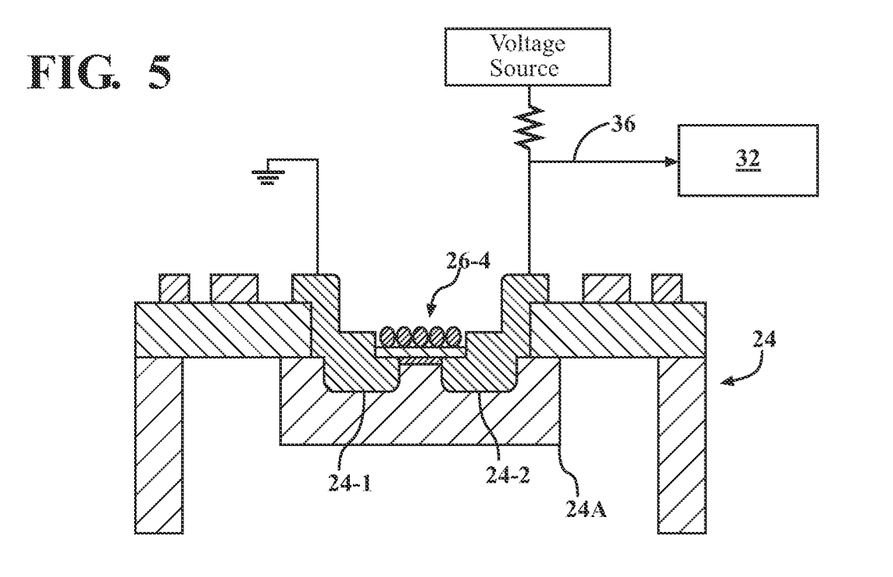
FIG. 5 is a schematic cross-sectional side view of the gas sensor array shown in FIG. 4, specifically depicting one of the individual CS-FETs, according to the present disclosure.

As shown in FIGS. 4 and 5, the SoC embodiment of the gas sensor array 24 may include a plurality of silicon chemical-sensitive field effect transistors (CS-FETs) 26. The CS-FETs 26 are configured to detect functionally significant amounts of multiple chemically distinct gases vented by the Li-ion battery cell(s) 14. Each of the individual CS-FETs 26 is configured to detect one of the gases vented by the Li-ion battery cell 14. Each individual CS-FET 26 is differentiated from the other CS-FETs by a distinct nano-material catalyst element, depicted in FIG. 4 as elements 26-1, 26-2, 26-3, and 26-4. In a cross-sectional plane 5-5 indicated in FIG. 4, FIG. 5 specifically depicts a schematic section of an individual CS-FET 26-4 mounted on the SoC gas sensor array 24. Within a single CS-FET 26, the nano-material catalyst element, either 26-1, 26-2, 26-3, or 26-4, is responsible for interaction with the vented gas. The respective nano-material catalyst elements 26-1, 26-2, 26-3, and 26-4 may be constructed from metals like Platinum (for detecting $C_2H_4$ gas), Palladium-Platinum (for detecting CO gas), or mixtures of metals like Nickel-Palladium (for detecting $H_2$ gas), and Gold-Copper (for detecting $CO_2$ gas). The thickness of each nano-material catalyst element may be in a range of 1-10 nm.

As shown in FIG. 5, the SoC embodiment of gas sensor array 24 includes a silicon transistor body 24A for supporting the respective nano-material catalyst elements 26-1, 26-2, 26-3, and 26-4. As additionally shown, the silicon transistor body 24A forms localized silicon islands to support a plurality of source terminals 24-1, one for each nano-material catalyst element 26-1, 26-2, 26-3, and 26-4, connected to ground. The silicon transistor body 24A also supports a plurality of drain terminals 24-2, each connecting a respective nano-material catalyst element 26-1, 26-2, 26-3, and 26-4 to a power source, via a digital or an analog converter (not shown). The nano-material catalyst elements 26-1, 26-2, 26-3, and 26-4 are electrically isolated from one another and are not connected to an electric voltage source. Each nano-material catalyst 26-1, 26-2, 26-3, and 26-4 is specifically configured to interact with and detect a specific gas without interference from other gases because of the subject catalyst's particular material properties.

Functionally, each CS-FET 26 embedded in the silicon transistor body 24A is analogous to a silicon electronic transistor. Generally, an electronic transistor has three electrodes, a source electrode, a gate electrode, and a drain electrode. The source electrode supplies the charge carriers to the transistor. The drain electrode collects or drains charge carriers or electrons. Charge carriers generally flow from the source electrode to the drain electrode upon application of a voltage across the drain to the source. The role of the gate electrode is to control this flow of the charge carriers, where the flow is regulated by the amount of voltage applied to the gate.

Operation of each CS-FET 26 is similar to the above-described electronic transistor, except that the flow of charge carriers from the source electrode to the drain electrode is controlled by an interaction between the particular gate electrode and a specific gas, rather than an application of a fixed electric voltage to the gate. More specifically, in each CS-FET 26, the respective nano-material catalyst 26-1, 26-2, 26-3, and 26-4 operates as the gate electrode, which is not connected to an electric voltage source. When a specific gas chemically interacts with the particular nano-material catalyst, a phenomenon generally described as "work-function change" is induced in the subject nano-material catalyst. The generated work-function change in turn changes the flow of charge carriers from the source to the drain, leading to a detection event of the vented gas.

The gas sensor array 24 may, for example, include other miniature and/or chip-based sensor technologies, such as metal oxide (MOX) and Thermal Conductivity (TC) gas sensors. Such MOX and TC technologies have certain advantages and drawbacks which may necessitate additional hardware and/or software to increase their effectiveness. Specifically, MOX sensors have useful low detection limits, but are prone to false positives when interfering gases are present, especially in battery packs that are not well sealed to the external environment. Gas sensor arrays 24 using MOX sensors may, however, utilize algorithms to improve gas selectivity, which may leverage artificial intelligence (AI) or otherwise augment sensor capabilities (although the same may also be applied to CS-FETs to provide even greater selectivity and/or lower limits of detection). MOX sensors generally have a limited dynamic sensing range causing the sensor to saturate at low detection levels and generate unreliable information about evolving higher gas concentrations. Also, MOX sensors have significant power consumption that may be a drain on the battery system. The TC sensors, on the other hand, have effective selectivity that generate few false positives, but generally have lower sensitivity to gas amounts vented by battery cells, e.g., Li-ion, in early phases, such as during Stage 1. TC sensors may also have limited capability to differentiate gases at different temperatures, which may possibly be buttressed via AI, and, like MOX, have high power consumption.

With continued reference to FIG. 1, the BMS 20 also includes an electronic controller 32 in operative communication with each of the gas sensor arrays 24 and with the battery cells 12, e.g., on a module level, of the RESS 10. The electronic controller 32 may be part of a RESS controller network (not shown) configured to manage operation of the RESS 10. Among various communication, processing, and management functions, the electronic controller 32 is configured, i.e., constructed and programmed, to receive from the gas sensor array(s) 24 data via a signal 36 indicative of the detected amounts of gases vented by the battery cell(s) 12. The data signal 36 generated by each gas sensor array 24 may be initially transmitted to an analog or digital converter (not shown) and then on to the electronic controller 32. The data signal 36 transmitted by each gas sensor array 24 is indicative of the amounts of gases detected by individual sensors of the subject array. The transmitted data signal 36 is shown superimposed over the curve G in FIG. 3 to illustrate how the amounts detected and transmitted to the electronic controller 32 corresponds to the three stages of damage in a representative battery cell 12 and the corresponding increase in the amount of vented gas.

The gas sensor arrays 24 (such as including the CS-FETs 26, MOX, TC, or other technologies) may be physically wired to the electronic controller 32 (as shown in FIG. 1) or communicate with the electronic controller wirelessly. To affect wireless communication, the electronic controller 32 may include an antenna 32-1 for receiving the data 36 from each gas sensor array 24, for which purpose each microchip may also be equipped with a respective antenna (not shown). To support requisite management of the RESS 10, the electronic controller 32 specifically includes a processor and tangible, non-transitory memory, which includes instructions for operation of the BMS 20 programmed therein. The memory may be an appropriate recordable medium that participates in providing computer-readable data or process instructions. Such a recordable medium may take many forms, including but not limited to non-volatile media and volatile media.

Non-volatile media for the electronic controller 32 may include, for example, optical or magnetic disks and other persistent memory. Volatile media may include, for example, dynamic random-access memory (DRAM), which may constitute a main memory. The instructions programmed into the electronic controller 32 may be transmitted by one or more transmission medium, including coaxial cables, copper wire and fiber optics, including the wires that comprise a system bus coupled to a processor of a computer, or via a wireless connection. Memory of the electronic controller 32 may also include a flexible disk, hard disk, magnetic tape, another magnetic medium, a CD-ROM, DVD, another optical medium, etc. The electronic controller 32 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithm(s), indicated generally via numeral 34, required by the electronic controller 32 or accessible thereby may be stored in the memory of the electronic controller 32 and automatically executed to facilitate operation of the BMS 20. Specifically, the algorithm(s) 34 may include an inventory mode configured to monitor the gas sensor array(s) 24 and/or interrogate the gas sensor array(s) at predetermined time intervals to verify effective line of communication with and operation of the gas sensor array(s).

The electronic controller 32 is also specifically configured, i.e., structured and programmed (such as using the algorithm(s) 34), to receive from one or more of the gas sensor arrays 24 the data signal 36 indicative of the detected trace amount 22A of the gas(s) emitted by the battery cell(s) 12. The electronic controller 32 is also configured to compare the received data 36 indicative of the trace amount of the gas(s) with a respective predetermined threshold margin 38 relative to the amount 22C of the corresponding gas emitted within the boundaries of Stage 3 (shown in FIG. 3). The threshold margin 38 may be established empirically for each individual vented gas and then programmed into the electronic controller 32. As noted above, the amount 22C therefore defines an emitted amount of a specific gas that is indicative of damage in the battery cell(s) sufficient to trigger the irreversible thermal runaway 18. The threshold margin 38 defines a particular delta between the amount 22C of vented gas in Stage 3 and the detected trace amount 22A.

The programmed threshold margin 38 is intended to establish a degree of RESS operating safety by delimiting an amount of emitted gas that identifies damage at an early stage, while not falsely triggering on trace levels of gas found in the environment. The threshold margin 38 may indicate an amount of the emitted gas within the boundaries of either Stage 1 or Stage 2 (shown in FIG. 3). The threshold margin 38 for each individual gas may be established based on the amount of gas emitted from a failing cell during Stage 1 and the relative position of the gas sensor array 24 in the RESS 10, e.g., effective distance of each gas sensor array from the constituent battery cells and the total free volume in the battery module or pack. For a Li-ion embodiment of the battery cells 12, each gas sensor array 24 may be configured to detect a trace amount of hydrogen ($H_2$), carbon dioxide ($CO_2$), and carbon monoxide (CO). For example, in the case of the Li-ion battery cells 12, the detected trace amount may be 10 ppm for $H_2$, 500 ppm for $CO_2$, and 10 ppm for CO.

The electronic controller 32 is additionally configured to identify one or more battery cells 12, such as a particular module 14-1, 14-2, 14-3, or 14-4, associated with the data signal 36 from the respective gas sensor array(s) 24 as having been damaged when the detected trace amount 22A is within the threshold margin 38. The electronic controller 32 is further configured to command a corrective action 40 to mitigate further damage to the damaged battery cell(s) 12. The corrective action 40 is intended to reduce a likelihood of the damaged battery cell(s) 12 entering the irreversible battery cell thermal runaway 18. Specifically, the corrective action 40 may be a change in one or more battery cell operating parameters. For example, the corrective action 40 may include physically or electrically disconnecting the damaged battery cell(s) from the RESS 10. The corrective action 40 may also include adjusting, e.g., increasing and/or decreasing, a current discharge rate of the damaged battery cell(s) 12. The corrective action 40 may additionally include controlling of charging from mains power and/or, specifically in EVs, via regenerative braking.

For example, the electronic controller 32 may be configured to disconnect the damaged battery cell(s) 12 from a battery charging device 42, such as via opening a switch 44-1 in the circuit connecting the charging device to the corresponding battery module 14 or pack 16 (shown in FIG. 1). The RESS 10 may be connected to an electrical load 46 and to the electronic controller 32 via a high-voltage BUS 48 (also shown in FIG. 1). In such an embodiment, the electronic controller 32 may be configured to disconnect the damaged battery cell(s) 12 from the electrical load 46, such as via opening a switch 44-2 in the circuit connecting the electrical load to the corresponding battery module 14 or pack 16. The corrective action 40 may also include regulating the RESS climate-control subsystem 19. For example, the electronic controller 32 may increase a cooling rate of the damaged battery cell(s) 12, such as by controlling output of a fluid pump or a compressor 50 associated with a particular embodiment of the RESS climate-control subsystem 19.

The rechargeable RESS 10 may employ charge balancing configured to shift electrical charge from a battery cell 12 with lower charge capacity to another battery cell with higher charge capacity. Charge balancing is typically employed to optimize energy storage in a battery pack, such as the pack 16. Charge balancing may be either active, where charge is moved from a cell with lower capacity to a cell with higher capacity, or passive, where cells with lower capacity are permitted to dissipate energy to enable additional charging to cells with greater capacity. Charge balancing may be programmed into the electronic controller 32, as indicated in FIG. 1 via numeral 54. Charge balancing may be active, where charge is moved from a battery cell with lower capacity to a cell with higher capacity, or passive, where energy of battery cells with lower capacity is dissipated to cells with greater capacity, to enable additional charging of the RESS 10. In such an embodiment of the RESS 10, the corrective action 40 may include either increasing or decreasing a rate of the charge balancing 54 (either active or passive) via the electronic controller 32 across individual battery cells 12 in the RESS.

Each battery module 14-1, 14-2, 14-3, 14-4 in the RESS 10 may have multiple battery cells 12 electrically connected in parallel and in series. The RESS 10 may include a plurality of gas sensor arrays 24, where one or more of the gas sensor arrays corresponds to each individual battery module 14-1, 14-2, 14-3, 14-4 (shown in FIG. 1). Specifically, each of the gas sensor arrays 24 may be arranged in strategic locations within the battery pack 16, such as near opposite walls and/or in a centralized location of a particular module holder 14A. The electronic controller 32 may be additionally configured to identify a battery module 14-1, 14-2, 14-3, 14-4 having the damaged battery cell(s) 12 when the trace amount 22A detected by a corresponding gas sensor array 24 is within the threshold margin 38. Alternatively, in the RESS 10 not subdivided into discrete modules, the location of the damaged battery cell(s) 12 may be identified using predefined positions of the plurality of gas sensor arrays 24 in the battery pack 16 and the received sensor data. The electronic controller 32 may use the data indicative of the detected trace amount 22A received from each gas sensor array 24 associated with a particular location in the battery pack 16 and based on the difference in detected trace amounts assess which battery cell(s) 12 are most likely to be damaged.

The corrective action 40 may include disconnecting, either physically or electrically, the identified battery module 14-1, 14-2, 14-3, 14-4 having the damaged battery cell(s) 12 from the RESS 10. The electronic controller 32 may be additionally configured to regulate the RESS climate control subsystem 19 to increase a cooling rate of the identified battery module 14-1, 14-2, 14-3, 14-4 having the damaged battery cell(s) 12. In an embodiment of the RESS 10 having more than one of gas sensor arrays 24 arranged on each individual battery module 14-1, 14-2, 14-3, 14-4, the electronic controller 32 may be further configured to identify a location 56 (indicated in FIG. 1) of the damaged battery cell(s) 12 using known positioning of each of the gas sensor arrays 24 in the identified battery module and the received data therefrom. The electronic controller 32 may also command application of the corrective action 40 to the particular damaged battery cell(s) 12 at the identified location 56.

Figure 6:
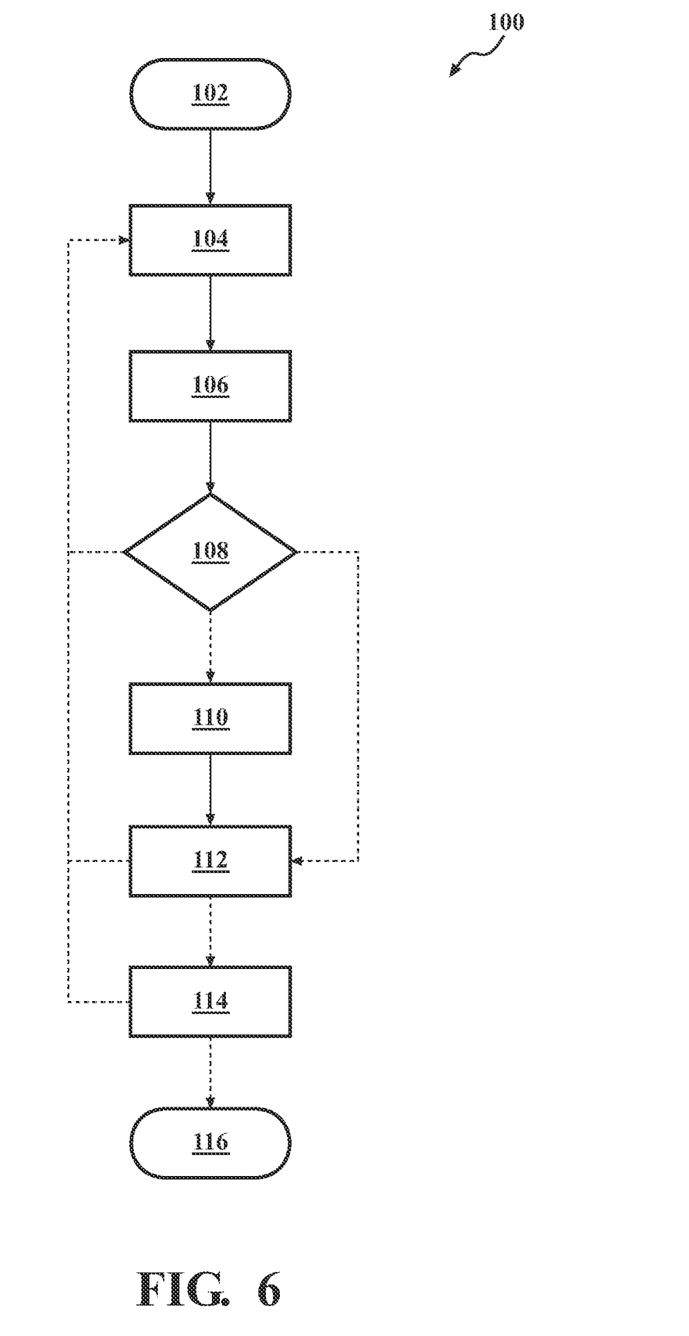
FIG. 6 illustrates a method of managing operation of a rechargeable energy storage system (RESS) using a battery management system (BMS) shown in FIGS. 1-5.

A method 100 of managing operation of a rechargeable energy storage system, such as the RESS 10, is shown in FIG. 6 and described below with reference to the structure shown in FIGS. 1-5. The method 100 may be embedded in the algorithm(s) 34 programmed into the electronic controller 32. Method 100 commences in frame 102 with detecting, via the gas sensor array(s) 24 of the BMS 20, one or more distinct gases vented by the RESS battery cell(s) 12 indicative of cell damage prior to the battery cell(s) entering irreversible thermal runaway event. As discussed above with respect to FIGS. 1-5, the gas sensor array(s) 24 may include the CS-FETs 26, MOX, TC, or other sensor technologies. Following frame 102, the method advances to frame 104. In frame 104, the method includes receiving, via the electronic controller 32, from one or more gas sensor arrays 24 the data 36 indicative of the detected trace amount(s) 22A of the vented gas(s). From frame 104, the method moves on to frame 106.

In frame 106, the method includes comparing, via the electronic controller 32, the received data 36 indicative of the trace amount 22A of the vented gas(s) detected by the gas sensor array(s) 24 with the threshold margin 38. As described above with respect to FIGS. 1-5, the threshold margin 38 is a delta in the gas amount relative to the amount of the corresponding gas indicative of damage in the battery cell(s) 12 sufficient to trigger the irreversible battery cell thermal runaway 18, such as indicated via numeral 22C in FIG. 3. After frame 106, the method proceeds to frame 108. In frame 108, the method includes identifying, via the electronic controller 32, whether the subject battery cell(s) 32 are damaged. Specifically, the subject battery cell(s) 32 is considered damaged when the detected trace 22A amount is within the threshold margin 38 of the amount indicative of battery cell damage corresponding to the irreversible battery cell thermal runaway 18.

If in frame 108 the electronic controller 32 determines that the detected trace 22A amount is outside the threshold margin 38, the damage of the battery cell(s) 12 does not correspond to the irreversible battery cell thermal runaway 18 and the method loops back to frame 104. If in frame 108 the electronic controller 32 determines that the detected trace 22A amount is within the threshold margin 38, the method may proceed to frame 110 or directly to frame 112. In frame 110, the method may include identifying, via the electronic controller 32, the RESS battery module, such as the module 14-1, 14-2, 14-3, or 14-4, having the damaged battery cell(s) 12 when the detected trace amount 22A is within the threshold margin 38. Following frame 110, the method advances to frame 112.

In frame 112, the method includes commanding, via the electronic controller 32, the corrective action 40 to mitigate further damage to the damaged battery cell(s) 12 and thereby reduce the likelihood of the damaged battery cell(s) entering the irreversible battery cell thermal runaway 18. The corrective action 40 may include disconnecting the identified battery module 14-1, 14-2, 14-3, or 14-4 having the damaged battery cell(s) 12 from the RESS 10: adjusting a current charge and/or discharge rate of the damaged battery cell(s): increasing or decreasing a rate of the charge balancing 54 across individual battery cells: regulating the RESS climate control subsystem 19 to increase a cooling rate of the identified battery cell(s) or to a specific battery module; and/or identifying the location of the damaged battery cell(s) within the identified module 14 or in the pack 16 using known positioning of each of the plurality of gas sensor arrays 24 and the corresponding data 36.

In frame 112, the method may also include commanding application of the corrective action 40 to the damaged battery cells (12) at the identified location 56. Following frame 112, the method may proceed to frame 114. In frame 114, the method may include triggering, via the electronic controller 32, a warning signal 58 indicative of the corrective action 40 having been taken to mitigate further damage to the damaged battery cell(s) 12. In frame 114, an identification of the subject corrective action 40 and the time the corrective action was taken may also be stored, such as via a digital code, within the memory of the electronic controller 32. The stored digital code may be retrieved by an authorized technician or communicated to a central processing and storage authority, such as an information technology (IT) cloud server 60 including a database (shown in FIG. 1).

As shown, the IT cloud server 60 is arranged remotely from and in wireless communication with the electronic controller 32, such as via the antenna 32-1, and/or with the RESS 10, thus enabling centralized system access and management. Requisite communication between the electronic controller 32 and the IT cloud server 60 may be cellular or via wireless local area networking (Wi-Fi) facilitated by a cloud edge residing on a cellular base station for reduced latency, or via an earth-orbiting satellite (not shown). Accordingly, as envisioned, the method 100 enables continuous monitoring the RESS 10 battery cell(s) 12 for detecting cell damage prior to the damage becoming catastrophic and mitigating irreversible battery cell thermal runaway 18 via various corrective actions. Consequently, following either of the frames 112 or 114, the method may loop back to frame 104 for continued monitoring of the RESS via the BMS 20 and detecting gases vented by the battery cell(s) 12 via the gas sensor array(s) 24. Alternatively, the method may conclude in frame 116.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A rechargeable energy storage system (RESS) comprising:
    at least one battery cell; and
    a battery management system (BMS) configured to detect damage in the at least one battery cell prior to the at least one battery cell entering an irreversible thermal runaway event, the battery management system including:
       at least one gas sensor array configured to detect one or more distinct gases vented by the at least one battery cell, wherein each gas sensor in the array is configured to detect a trace amount of one of the gases vented by the at least one battery cell indicative of damage in the at least one battery cell insufficient to trigger an irreversible battery cell thermal runaway; and
       an electronic controller in operative communication with the at least one gas sensor array and with the at least one battery cell and configured to:
          receive from the at least one gas sensor array data indicative of the detected trace amount of the at least one gas;
          compare the received data indicative of the trace amount of the at least one gas with a threshold margin relative to an amount of the corresponding at least one gas indicative of damage in the at least one battery cell sufficient to trigger the irreversible battery cell thermal runaway;
          identify the at least one battery cell as having been damaged when the detected trace amount is within the threshold margin; and
          command a corrective action to mitigate further damage to the damaged at least one battery cell and reduce a likelihood of the damaged at least one battery cell entering the irreversible battery cell thermal runaway.

2. The rechargeable RESS of claim 1, wherein:
    the at least one battery cell includes a plurality of battery cells subdivided into multiple battery modules, each battery module having multiple battery cells connected in at least one of parallel and series;
    the at least one gas sensor array includes a plurality of gas sensor arrays and at least one of the plurality of gas sensor arrays corresponds to each individual battery module; and
    the electronic controller is additionally configured to identify a battery module having the damaged at least one battery cell when the trace amount of the at least one gas detected by a corresponding gas sensor array is within the threshold margin.

3. The rechargeable RESS of claim 2, wherein the corrective action includes disconnecting the identified battery module having the damaged at least one battery cell from the RESS.

4. The rechargeable RESS of claim 2, further comprising an RESS climate control subsystem configured to regulate temperature of the at least one battery cell, and wherein the corrective action includes regulating the RESS climate control subsystem to increase a cooling rate of the identified battery module having the damaged at least one battery cell.

5. The rechargeable RESS of claim 1, wherein:
    more than one of the plurality of gas sensor arrays are arranged in distinct predefined positions in the RESS; and
    the electronic controller is further configured to identify location of the damaged at least one battery cell using the predefined positions of the plurality of gas sensor arrays and the received data therefrom.

6. The rechargeable RESS of claim 5, wherein electronic controller is further configured to command application of the corrective action to the damaged at least one battery cell at the identified location.

7. The rechargeable RESS of claim 1, wherein the corrective action includes disconnecting the damaged at least one battery cell from the RESS.

8. The rechargeable RESS of claim 1, further comprising an RESS climate control subsystem configured to regulate temperature of the at least one battery cell, and wherein the corrective action includes regulating the RESS climate control subsystem to increase a cooling rate of the damaged at least one battery cell.

9. The rechargeable RESS of claim 1, wherein the corrective action includes adjusting at least one of a current charge and a current discharge rate of the damaged at least one battery cell.

10. The rechargeable RESS of claim 1, wherein:
    the RESS employs charge balancing configured to shift electrical charge from a battery cell with lower charge capacity to a battery cell with higher charge capacity; and
    the corrective action includes one of increasing and decreasing a rate of the charge balancing across individual battery cells in the RESS.

11. A method of managing operation of a rechargeable energy storage system (RESS) having at least one battery cell, the method comprising:
    detecting, via a battery management system (BMS), one or more distinct gases vented by the at least one battery cell indicative of damage in the at least one battery cell prior to the at least one battery cell entering an irreversible thermal runaway event, wherein:
       the BMS includes at least one gas sensor array configured to detect the one or more distinct gases; and
       each gas sensor is configured to detect a trace amount of one of the gases vented by the at least one battery cell indicative of damage in the at least one battery cell insufficient to trigger an irreversible battery cell thermal runaway;
    receiving, via an electronic controller in operative communication with the at least one gas sensor array and with the at least one battery cell, from the at least one gas sensor array data indicative of the detected trace amount of the at least one gas;

comparing, via the electronic controller, the received data indicative of the trace amount of the at least one gas with a threshold margin relative to an amount of the corresponding at least one gas indicative of damage in the at least one battery cell sufficient to trigger the irreversible battery cell thermal runaway;

identifying, via the electronic controller, the at least one battery cell as having been damaged when the detected trace amount is within the threshold margin; and commanding, via the electronic controller, a corrective action to mitigate further damage to the damaged at least one battery cell and reduce a likelihood of the damaged at least one battery cell entering the irreversible battery cell thermal runaway.

12. The method of claim 11, wherein:

the at least one battery cell includes a plurality of battery cells subdivided into multiple battery modules, each battery module having multiple battery cells connected in at least one of parallel and series; and the at least one gas sensor array includes a plurality of gas sensor arrays and at least one of the plurality of gas sensor arrays corresponds to each individual battery module;

the method further comprising identifying, via the electronic controller, a battery module having the damaged at least one battery cell when the trace amount of the at least one gas detected by a corresponding gas sensor array is within the threshold margin.

13. The method of claim 12, wherein the corrective action includes disconnecting the identified battery module having the damaged at least one damaged battery cell from the RESS.

14. The method of claim 12, wherein:

the RESS additionally includes an RESS climate control subsystem configured to regulate temperature of the at least one battery cell; and the corrective action includes regulating the RESS climate control subsystem to increase a cooling rate of the identified battery module having the damaged at least one battery cell.

15. The method of claim 11, wherein more than one of the plurality of gas sensor arrays are arranged in distinct predefined positions in the RESS, further comprising identifying, via the electronic controller, location of the damaged at least one battery cell using the predefined positions of the plurality of gas sensor arrays and the received data therefrom.

16. The method of claim 15, further comprising, commanding, via the electronic controller, application of the corrective action to the damaged at least one battery cell at the identified location.

17. The method of claim 11, wherein the corrective action includes disconnecting the damaged at least one battery cell from the RESS.

18. The method of claim 11, wherein:

the RESS additionally includes an RESS climate control subsystem configured to regulate temperature of the at least one battery cell; and the corrective action includes regulating the RESS climate control subsystem to increase a cooling rate of the damaged at least one battery cell.

19. The method of claim 11, wherein the corrective action includes adjusting at least one of a current charge and a current discharge rate of the damaged at least one battery cell.

20. The method of claim 11, wherein:

the RESS employs charge balancing configured to shift electrical charge from a battery cell with lower charge capacity to a battery cell with higher charge capacity; and the corrective action includes one of increasing and decreasing a rate of the charge balancing across individual battery cells in the RESS.

* * * * *